(12) United States Patent
Hirayama

(10) Patent No.: US 8,865,836 B2
(45) Date of Patent: Oct. 21, 2014

(54) TIRE RUBBER COMPOSITION AND PNEUMATIC TIRE

(75) Inventor: Michio Hirayama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 168 days.

(21) Appl. No.: 13/541,988

(22) Filed: Jul. 5, 2012

(65) Prior Publication Data

US 2013/0012660 A1 Jan. 10, 2013

(30) Foreign Application Priority Data

Jul. 6, 2011 (JP) .................................. 2011-150304
Jun. 6, 2012 (JP) .................................. 2012-129282

(51) Int. Cl.
*C08L 15/00* (2006.01)
*C08L 19/00* (2006.01)
*C08C 19/44* (2006.01)

(52) U.S. Cl.
CPC ................. *C08C 19/44* (2013.01); *C08L 15/00* (2013.01); *C08L 19/006* (2013.01)
USPC ............................ 525/100; 525/101; 525/237

(58) Field of Classification Search
USPC ..................................... 525/93, 100, 101, 237
See application file for complete search history.

(56) References Cited

U.S. PATENT DOCUMENTS

| | | | |
|---|---|---|---|
| 5,219,938 A * | 6/1993 | Imai et al. | 525/102 |
| 2006/0004143 A1* | 1/2006 | Inagaki et al. | 525/192 |
| 2012/0172526 A1* | 7/2012 | Cheng et al. | 525/69 |

FOREIGN PATENT DOCUMENTS

| | | | |
|---|---|---|---|
| JP | H01-284504 A | 11/1989 |
| JP | 2002-201307 A | 7/2002 |
| JP | 2005-225946 A | 8/2005 |
| JP | 2005-344039 A | 12/2005 |
| JP | 2007-112994 A | 5/2007 |

* cited by examiner

*Primary Examiner* — Jeffrey Mullis
(74) *Attorney, Agent, or Firm* — Birch, Stewart, Kolasch & Birch, LLP

(57) ABSTRACT

The present invention provides a tire rubber composition with which the grip performance, the abrasion resistance, and the performance in terms of rolling resistance are improved in a balanced manner. The present invention relates to a tire rubber composition comprising: a modified diene rubber A which is modified with a specific acrylamide compound; and a modified diene rubber B which is modified with a specific modifying compound alone or together with a specific silicon or tin compound, a weight average molecular weight of a total of the modified diene rubbers A and B being 300,000 to 1,400,000.

9 Claims, No Drawings

TIRE RUBBER COMPOSITION AND PNEUMATIC TIRE

TECHNICAL FIELD

The present invention relates to a tire rubber composition and a pneumatic tire produced using the rubber composition.

BACKGROUND ART

Recently, pneumatic tires for automobiles have been required to have a wide range of performance properties, such as fuel economy (the performance in terms of rolling resistance), grip performance (handling stability) and abrasion resistance. Various methods have been proposed to achieve improvement in these performance properties.

For example, a known method for improving the abrasion resistance is to use natural rubber or butadiene rubber as a rubber component. This method, however, tends to deteriorate the grip performance. An exemplary method for enhancing both the abrasion resistance and grip performance is to increase the amount of a reinforcing agent such as carbon black and silica. In this method, however, the performance in terms of rolling resistance tends to be deteriorated.

Other methods for improving the abrasion resistance and grip performance include a method of adding a polymer obtained by polymerization of only an aromatic vinyl monomer, and a method of adding a hydrogenation product of a low-molecular weight aromatic vinyl-conjugated diene copolymer (Patent Documents 1 and 2). However, there still remains a demand to improve the grip performance and abrasion resistance as well as the performance in terms of rolling resistance in a balanced manner because these properties usually conflict with each other and it is difficult to improve these simultaneously.

Patent Document 1: JP-A 2007-112994
Patent Document 2: JP-A 2005-225946

SUMMARY OF THE INVENTION

The present invention aims to provide a tire rubber composition with which the above problem is solved and the grip performance, the abrasion resistance, and the performance in terms of rolling resistance are improved in a balanced manner.

The present invention relates to a tire rubber composition comprising: a modified diene rubber A which is modified with an acrylamide compound represented by the following formula (I); and a modified diene rubber B which is modified with a modifying compound represented by the following formula (III) alone or together with a silicon or tin compound represented by the following formula (II), a weight average molecular weight of a total of the modified diene rubbers A and B being 300,000 to 1,400,000, the formula (I) being as follows:

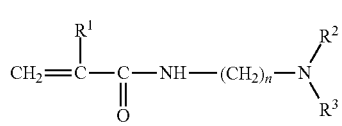

wherein $R^1$ represents hydrogen or a methyl group, $R^2$ and $R^3$ each represent an alkyl group, and n represents an integer; the formula (II) being as follows:

$$R_a M X_b \quad \text{(II)}$$

wherein R represents an alkyl, alkenyl, cycloalkenyl, or aromatic hydrocarbon group, M represents silicon or tin, X represents halogen, a represents an integer of 0 to 2, and b represents an integer of 2 to 4; and
the formula (III) being as follows:

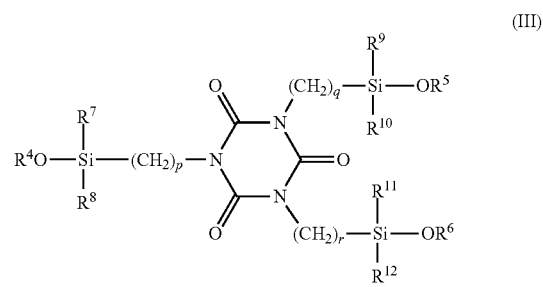

wherein $R^4$ to $R^6$ are the same as or different from each other and each represent a $C_{1-8}$ alkyl group, $R^7$ to $R^{12}$ are the same as or different from each other and each represent a $C_{1-8}$ alkoxy or alkyl group, and p to r are the same as or different from each other and each represent an integer of 1 to 8.

The modified diene rubbers A and B are preferably a mixture which is prepared by reacting an active conjugated diene polymer having an alkali metal end with the acrylamide compound and with the modifying compound alone or together with the silicon or tin compound, the active conjugated diene polymer being obtained by polymerizing a conjugated diene monomer alone or together with an aromatic vinyl monomer, in the presence of an alkali metal catalyst in a hydrocarbon solvent.

Preferably, in the modifying compound represented by the formula (III), $R^4$ to $R^6$ each are a methyl, ethyl, propyl or butyl group, $R^7$ to $R^{12}$ each are a methoxy, ethoxy, propoxy or butoxy group, and p to r each are an integer of 2 to 5.

The rubber composition preferably further comprises an aromatic vinyl polymer obtained by polymerizing at least one of α-methylstyrene and styrene.

The present invention also relates to a tire rubber composition comprising a mixture prepared by reacting an active conjugated diene polymer having an alkali metal end with two or more modifying agents, the active conjugated diene polymer being obtained by polymerizing a conjugated diene monomer alone or together with an aromatic vinyl monomer, in the presence of an alkali metal catalyst in a hydrocarbon solvent.

The present invention further relates to a pneumatic tire comprising a tread produced using the tire rubber composition.

The tire rubber composition according to the present invention contains a modified diene rubber A having an end modified with a specific acrylamide compound, and a modified diene rubber B which is modified with a specific modifying compound alone or together with a silicon or tin compound. Also in the tire rubber composition, the weight average molecular weight of a total of the rubbers A and B is in a specific range. Such a tire rubber composition enables to synergistically improve the performance balance in terms of grip performance, abrasion resistance, and rolling resistance.

BEST MODE FOR CARRYING OUT THE INVENTION

The tire rubber composition of the present invention contains modified diene rubbers A and B, and the weight average molecular weight of a total of the rubbers A and B is in a specific range.

The modified diene rubber A is a diene rubber modified with an acrylamide compound represented by the formula (I):

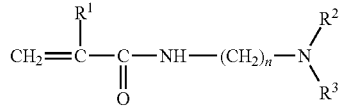

(I)

wherein $R^1$ represents hydrogen or a methyl group, $R^2$ and $R^3$ each represent an alkyl group, and n represents an integer. This rubber constitutes a diene rubber having a polymer end modified with the acrylamide compound.

In the formula (I), $R^2$ and $R^3$ each are preferably a $C_{1-4}$ alkyl group, and n is preferably an integer of 2 to 5.

Specific examples of the acrylamide compound include N,N-dimethylaminomethylacrylamide, N,N-ethylmethylaminomethylacrylamide, N,N-diethylaminomethylacrylamide, N,N-ethylpropylaminomethylacrylamide, N,N-dipropylaminomethylacrylamide, N,N-butylpropylaminomethylacrylamide, N,N-dibutylaminomethylacrylamide, N,N-dimethylaminoethylacrylamide, N,N-ethylmethylaminoethylacrylamide, N,N-diethylaminoethylacrylamide, N,N-ethylpropylaminoethylacrylamide, N,N-dipropylaminoethylacrylamide, N,N-butylpropylaminoethylacrylamide, N,N-dibutylaminoethylacrylamide, N,N-dimethylaminopropylacrylamide, N,N-ethylmethylaminopropylacrylamide, N,N-diethylaminopropylacrylamide, N,N-ethylpropylaminopropylacrylamide, N,N-dipropylaminopropylacrylamide, N,N-butylpropylaminopropylacrylamide, N,N-dibutylaminopropylacrylamide, N,N-dimethylaminobutylacrylamide, N,N-ethylmethylaminobutylacrylamide, N,N-diethylaminobutylacrylamide, N,N-ethylpropylaminobutylacrylamide, N,N-dipropylaminobutylacrylamide, N,N-butylpropylaminobutylacrylamide, and N,N-dibutylaminobutylacrylamide, and the corresponding methacrylamides. In particular, N,N-dimethylaminopropylacrylamide is preferred because it improves performance in terms of grip performance, abrasion resistance, and rolling resistance in a balanced manner.

The modified diene rubber B is a diene rubber modified with a silicon or tin compound represented by the formula (II) and a modifying compound represented by the formula (III), or a diene rubber modified with a modifying compound represented by the formula (III). The former rubber is a diene rubber in which a polymer end is coupled with the silicon or tin compound and then modified with the modifying compound. The latter rubber is a diene rubber having a polymer end modified with the modifying compound.

$$R_aMX_b \quad (II)$$

In the formula (II), R represents an alkyl, alkenyl, cycloalkenyl, or aromatic hydrocarbon group, M represents silicon or tin, X represents halogen, a represents an integer of 0 to 2, and b represents an integer of 2 to 4.

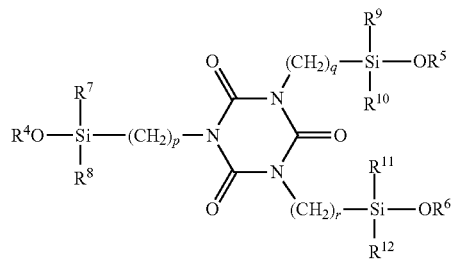

(III)

In the formula (III), $R^4$ to $R^6$ are the same as or different from each other and each represent a $C_{1-8}$ alkyl group, $R^7$ to $R^{12}$ are the same as or different from each other and each represent a $C_{1-8}$ alkoxy or alkyl group, and p to r are the same as or different from each other and each represent an integer of 1 to 8.

The silicon or tin compound represented by the formula (II) functions as a coupling agent for diene rubber. Examples of the silicon compound include tetrachlorosilicon, tetrabromosilicon, methyltrichlorosilicon, butyltrichlorosilicon, dichlorosilicon, and bistrichlorosilylsilicon. Examples of the tin compound include tetrachlorotin, tetrabromotin, methyltrichlorotin, butyltrichlorotin, dichlorotin, and bistrichlorosilyltin.

In the formula (III), $R^4$ to $R^6$ each are preferably a methyl, ethyl, propyl or butyl group, $R^7$ to $R^{12}$ each are preferably a methoxy, ethoxy, propoxy or butoxy group, and p to r each are preferably an integer of 2 to 5. Such a structure improves performance in terms of grip performance, abrasion resistance, and rolling resistance in a balanced manner.

Specific examples of the modifying compound represented by the formula (III) include 1,3,5-tris(3-trimethoxysilylpropyl)isocyanurate, 1,3,5-tris(3-triethoxysilylpropyl)isocyanurate, 1,3,5-tris(3-tripropoxysilylpropyl)isocyanurate, and 1,3,5-tris(3-tributoxysilylpropyl)isocyanurate. In particular, 1,3,5-tris(3-trimethoxysilylpropyl)isocyanurate is preferred because it improves performance in terms of grip performance, abrasion resistance, and rolling resistance in a balanced manner.

The modified diene rubbers A and B may, for example, be prepared as a mixture by producing the rubbers A and B separately and blending them. In such a case, the modified diene rubbers A and B each may be produced as described below.

The modified diene rubber A may be produced by reacting an active conjugated diene polymer having an alkali metal end with an acrylamide compound represented by the formula (I). Here, the active conjugated diene polymer having an alkali metal end is produced by polymerizing a conjugated diene monomer alone or together with an aromatic vinyl monomer, in the presence of an alkali metal catalyst in a hydrocarbon solvent.

Examples of the conjugated diene monomer include 1,3-butadiene, isoprene, 1,3-pentadiene (piperylene), 2,3-dimethyl-1,3-butadiene, and 1,3-hexadiene. Considering the physical properties of the resulting polymer and the availability for industrial purposes, 1,3-butadiene and isoprene are preferred among these.

Examples of the aromatic vinyl monomer include styrene, α-methylstyrene, vinyltoluene, vinylnaphthalene, divinylbenzene, trivinylbenzene, and divinylnaphthalene. Considering the physical properties of the resulting polymer and the availability for industrial purposes, styrene is preferred among these.

The hydrocarbon solvent is not particularly limited as long as it is a solvent that does not deactivate an alkali metal catalyst. Examples thereof include aliphatic hydrocarbons, aromatic hydrocarbons, and alicyclic hydrocarbons. Specific examples thereof include those with 3 to 12 carbon atoms such as propane, n-butane, iso-butane, n-pentane, iso-pentane, n-hexane, cyclohexane, benzene, toluene, and xylene.

Examples of the alkali metal catalyst include metals such as lithium, sodium, potassium, rubidium, and cesium, and hydrocarbon compounds containing these metals. Preferred alkali metal catalysts include lithium- or sodium-containing compounds having 2 to 20 carbon atoms. Specific examples thereof include ethyllithium, n-propyllithium, iso-propyllithium, n-butyllithium, sec-butyllithium, t-octyllithium, n-decyllithium, and phenyllithium.

The monomer to be polymerized may be the conjugated diene monomer either alone or together with the aromatic vinyl monomer. When the conjugated diene monomer and the aromatic vinyl monomer are used in combination, the ratio of these monomers (conjugated diene monomer/aromatic vinyl monomer) is preferably 50/50 to 90/10, and more preferably 55/45 to 85/15, on a mass basis.

In the polymerization, materials usually used, such as an alkali metal catalyst, a hydrocarbon solvent, a randomizer, an agent for controlling the vinyl bond content of the conjugated diene units, and the like may be used, and the method for producing the polymer is not particularly limited.

Various Lewis basic compounds may be used for controlling the vinyl bond content of the conjugated diene units. Considering the availability for industrial purposes, ether compounds and tertiary amines are preferred. Examples of the ether compounds include cyclic ethers such as tetrahydrofuran, tetrahydropyran, and 1,4-dioxane; aliphatic monoethers such as diethyl ether and dibutyl ether; and aliphatic diethers such as ethylene glycol dimethyl ether. Examples of the tertiary amines include triethylamine and tripropylamine.

On the occasion of adding the acrylamide compound to the active conjugated diene polymer having an alkali metal end to produce the modified diene rubber A, the amount of the acrylamide compound is usually 0.05 to 10 mol, and preferably 0.2 to 2 mol per mol of the alkali metal catalyst used for the addition of the alkali metal.

Since the reaction between the acrylamide compound and the active conjugated diene polymer having an alkali metal end rapidly proceeds, the reaction temperature and the reaction time can be selected from wide ranges. Typically, the reaction temperature is from room temperature to 100° C. and the reaction time is from few seconds to several hours. Any method may be employed for the reaction as long as the active conjugated diene polymer and the acrylamide compound are brought into contact. Mention may be made of, for example, a method in which the diene polymer is produced using an alkali metal catalyst, and a predetermined amount of the acrylamide compound is then added to the polymer solution.

After completion of the reaction, the modified diene polymer can be coagulated by a usual coagulation technique used in the production of rubber by solution polymerization, such as addition of a coagulant or steam coagulation, and then separated from the reaction solvent. Further, the coagulation temperature is not at all limited. The resulting modified diene rubber A has a molecular end to which the acrylamide compound has been introduced.

Meanwhile, the modified diene rubber B may be produced by: (a) reacting an active conjugated diene polymer having an alkali metal end with a silicon or tin compound (coupling agent) represented by the formula (II) and then with a modifying compound represented by the formula (III); or (b) reacting the active conjugated diene polymer having an alkali metal end with the modifying compound represented by the formula (III). Here, the active conjugated diene polymer having an alkali metal end is obtained by polymerizing a conjugated diene monomer alone or together with an aromatic vinyl monomer, in the presence of an alkali metal catalyst in a hydrocarbon solvent.

The active conjugated diene polymer having an alkali metal end may be obtained in the same manner as in the production of the modified diene rubber A. In the process (a), the silicon or tin compound is used usually in the range of 0.01 to 0.4 equivalents of the halogen atoms per equivalent of the terminal alkali metal atom of the active conjugated diene polymer. The coupling reaction is usually carried out at a temperature range of 20° C. to 100° C. The reaction of the modifying compound in the process (a) or (b) may be carried out in the same manner as in the reaction of the acrylamide compound mentioned above. The modified diene rubber B obtained has a molecular end to which the modifying compound has been introduced.

The modified diene rubbers A and B are preferably a mixture which is prepared through single-batch production of the rubbers A and B. In such a case, for example, the mixture may be prepared by reacting the active conjugated diene polymer having an alkali metal end with the acrylamide compound and with the modifying compound alone or together with the silicon or tin compound.

More specifically, the mixture may be prepared by, for example, the following process (c) or (d). In the process (c), an active conjugated diene polymer having an alkali metal end is produced by the same method as described above. Next, an acrylamide compound is added to the polymer solution. Then, a silicon or tin compound (coupling agent) is optionally added and a modifying compound is subsequently added thereto. Alternatively, in the process (d), after the production of the active conjugated diene polymer having an alkali metal end, an acrylamide compound, a modifying compound, and optionally a silicon or tin compound are simultaneously added to the polymer solution.

In such cases, the reactions with an acrylamide compound and with a modifying compound and the coupling reaction may be carried out in the same manner as mentioned above. The resulting mixture contains the modified diene rubber A having a molecular end to which the acrylamide compound has been introduced, and the modified diene rubber B having a molecular end to which the modifying compound has been introduced.

The weight average molecular weight (Mw) of a total of the modified diene rubbers A and B used in the rubber composition of the present invention (the weight average molecular weight measured for the entire composition consisting of the modified diene rubbers A and B) is not less than 300,000, preferably not less than 500,000, and more preferably not less than 600,000. The Mw is not more than 1,400,000, preferably not more than 1,200,000, and more preferably not more than 1,000,000. The Mw in that range improves performance in terms of grip performance, abrasion resistance, and rolling resistance in a balanced manner.

The molecular weight distribution (Mw/Mn) of a total of the modified diene rubbers A and B is preferably not more than 4, more preferably not more than 3.5, and still more preferably not more than 3. If the Mw/Mn is more than 4, the dispersibility of filler tends to be lowered to increase tan δ (deteriorate the performance in terms of rolling resistance).

As used herein, the number average molecular weight (Mn) and the weight average molecular weight (Mw) of the rubbers and the aromatic vinyl polymer mentioned later are determined relative to polystyrene standards based on measurement values obtained by a gel permeation chromatograph (GPC) (GPC-8000 series produced by TOSOH CORPORATION, detector: differential refractometer, column: TSKGEL SUPERMULTIPORE HZ-M produced by TOSOH CORPORATION).

The modified diene rubbers A and B each are preferably a modified butadiene rubber (modified BR) or a modified styrene butadiene rubber (modified SBR), and more preferably a modified SBR, because they improve performance in terms of grip performance, abrasion resistance, and rolling resistance in a balanced manner.

In the case where the modified diene rubbers A and B are modified SBRs, the vinyl bond content of the butadiene units of a total of the rubbers A and B is preferably not less than 20% by mass, and more preferably not less than 25% by mass. A modified diene rubber having a vinyl bond content of less than 20% by mass tends to be difficult to polymerize (produce). The vinyl bond content is preferably not more than 60% by mass, and more preferably not more than 55% by mass. If the vinyl bond content is more than 60% by mass, the dispersibility of filler tends to be lowered. The vinyl bond content (1,2-butadiene unit content) herein can be determined by infrared absorption spectrometry.

In the case where the modified diene rubbers A and B are modified SBRs, the styrene content of a total of the rubbers A and B is preferably not less than 15% by mass, and more preferably not less than 25% by mass. If the styrene content is less than 15% by mass, the grip performance tends to be deteriorated. The styrene content is preferably not more than 50% by mass, and more preferably not more than 45% by mass. If the styrene content is more than 50% by mass, the abrasion resistance tends to be deteriorated. The styrene content herein is determined by $^1$H NMR.

In the rubber composition of the present invention, the compounding ratio of the modified diene rubbers A and B (weight ratio of A/B) is preferably 5/95 to 95/5, more preferably 10/90 to 90/10, and still more preferably 20/80 to 80/20. The ratio below the lower limit tends to deteriorate the performance in terms of rolling resistance, while the ratio above the upper limit tends to deteriorate the abrasion resistance. In both cases, the balance among the above-mentioned performance properties tends to be lowered.

The total amount of the modified diene rubbers A and B in 100% by mass of the rubber component of the rubber composition is preferably not less than 2% by mass, more preferably not less than 5% by mass, and still more preferably not less than 10% by mass. If the total amount is less than 2% by mass, the performance may not be sufficiently improved in terms of rolling resistance and abrasion resistance. The upper limit of the total amount is not particularly limited, and may be 100% by mass. The upper limit is preferably not more than 90% by mass, and more preferably not more than 80% by mass.

Examples of other rubbers which may be contained in the rubber component in the present invention include diene rubbers such as natural rubber (NR), isoprene rubber (IR), butadiene rubber (BR), styrene butadiene rubber (SBR), acrylonitrile butadiene rubber (NBR), chloroprene rubber (CR), butyl rubber (IIR), halogenated butyl rubber (X-IIR), and styrene-isoprene-butadiene copolymer rubber (SIBR). In particular, SBR and BR are preferably used because they are highly compatible and highly contribute to better balance among the performance properties.

As the SBR, those commonly used in the tire industry, such as emulsion polymerized styrene butadiene rubber (E-SBR) and solution polymerized styrene butadiene rubber (S-SBR), may be used. Examples of the BR include BR having high cis content and BR containing syndiotactic polybutadiene crystals.

In the case where SBR (unmodified) is added, the SBR content is preferably not less than 20% by mass, and more preferably not less than 50% by mass. The content less than 20% by mass tends to deteriorate the grip performance. The SBR content is preferably not more than 90% by mass, and more preferably not more than 70% by mass. The content more than 90% by mass tends to deteriorate the abrasion resistance.

In the case where BR (unmodified) is added, the BR content is preferably not less than 5% by mass, and more preferably not less than 10% by mass. The content less than 5% by mass tends to deteriorate the abrasion resistance. The BR content is preferably not more than 40% by mass, and more preferably not more than 30% by mass. The content more than 40% by mass tends to deteriorate the grip performance.

The rubber composition of the present invention preferably contains at least one of carbon black and silica (preferably both ingredients) as filler. In the present invention, the use of the modified diene rubbers A and B significantly improves the dispersibility of filler such as silica and carbon black. Therefore, the performance balance in terms of grip performance, abrasion resistance, and rolling resistance is synergistically improved.

Such improvement is presumably achieved by the following actions.

The rubber A having an end modified with the acrylamide compound has higher interaction with silica or carbon black. If the rubber A is only used, however, filler agglomerates cannot be expected to break because the ratio of low molecular weight ingredients is large. As a result, it is difficult to enhance the dispersibility of filler. In contrast, in the present invention, since the rubber B having an end modified with the modifying compound is further used, the interaction with filler, especially with silica, is further increased. In addition, modified end groups of molecules of the rubber B interact with each other, while maintaining the interaction with silica, so that polymers are coupled to have a higher molecular weight. Then, filler agglomerates are sufficiently broken, and therefore the rubbers A and B efficiently and synergistically exert the effect of enhancing the dispersibility of filler. Presumably for this reason, the balance among the performance properties is significantly improved.

Use of carbon black increases reinforcement to improve the abrasion resistance and grip performance. The carbon black is not particularly limited, and examples thereof include GPF, FEF, HAF, ISAF, and SAF. Each carbon black may be used alone, or two or more thereof may be used in combination.

The nitrogen adsorption specific surface area ($N_2SA$) of carbon black is preferably not less than 50 $m^2/g$, and more preferably not less than 100 $m^2/g$. The $N_2SA$ less than 50 $m^2/g$ tends not to provide sufficient reinforcement. The $N_2SA$ of carbon black is preferably not more than 200 $m^2/g$, and more preferably not more than 150 $m^2/g$. The $N_2SA$ more than 200 $m^2/g$ tends to deteriorate the performance in terms of rolling resistance because such carbon black is less likely to be dispersed. Here, the nitrogen adsorption specific surface area of carbon black is determined in accordance with the A method of JIS K6217.

The dibutyl phthalate (DBP) oil absorption of carbon black is preferably not less than 60 ml/100 g, and more preferably not less than 100 ml/100 g. The DBP oil absorption less than 60 ml/100 g tends not to provide sufficient reinforcement. The DBP oil absorption of carbon black is preferably not more than 150 ml/100 g, and more preferably not more than 120 ml/100 g. The DBP oil absorption more than 150 ml/100 g tends to lower the processability and dispersibility.

Here, the DBP oil absorption of carbon black is determined by the measuring method of JIS K6217-4.

The carbon black content is preferably not less than 10 parts by mass, more preferably not less than 20 parts by mass, and sill more preferably not less than 30 parts by mass, for each 100 parts by mass of the rubber component. The carbon black content less than 10 parts by mass tends not to provide sufficient reinforcement. The carbon black content is preferably not more than 100 parts by mass, more preferably not more than 80 parts by mass, and still more preferably not more than 60 parts by mass, for each 100 parts by mass of the rubber component. The carbon black content more than 100 parts by mass tends to deteriorate the performance in terms of rolling resistance because such an amount of carbon black is less likely to be dispersed.

Use of silica increases reinforcement and, at the same time, improves the performance in terms of rolling resistance. Examples of the silica include silica produced by a wet method and silica produced by a dry method. Each silica may be used alone, or two or more thereof may be used in combination.

The nitrogen adsorption specific surface area ($N_2SA$) of silica is preferably not less than 120 $m^2/g$, and more preferably not less than 150 $m^2/g$. The $N_2SA$ less than 120 $m^2/g$ tends not to provide sufficient reinforcement. The $N_2SA$ of silica is preferably not more than 250 $m^2/g$, and more preferably not more than 200 $m^2/g$. The $N_2SA$ more than 250 $m^2/g$ tends to deteriorate the performance in terms of rolling resistance because such silica has lower dispersibility so that the hysteresis loss increases. Here, the nitrogen adsorption specific surface area of silica is determined in accordance with the BET method of ASTM D3037-81.

The silica content is preferably not less than 15 parts by mass, more preferably not less than 25 parts by mass, and still more preferably not less than 35 parts by mass, for each 100 parts by mass of the rubber component. The silica content less than 15 parts by mass tends not to provide sufficient reinforcement. The silica content is preferably not more than 100 parts by mass, more preferably not more than 85 parts by mass, and still more preferably not more than 65 parts by mass, for each 100 parts by mass of the rubber component. The silica content more than 100 parts by mass tends to deteriorate the performance in terms of rolling resistance because such an amount of silica has lower dispersibility.

In the rubber composition of the present invention, the total amount of carbon black and silica is preferably not less than 40 parts by mass, and more preferably not less than 70 parts by mass, for each 100 parts by mass of the rubber component. The total amount less than 40 parts by mass tends not to provide sufficient reinforcement. The total amount is preferably not more than 150 parts by mass, and more preferably not more than 110 parts by mass, for each 100 parts by mass of the rubber component. The total amount more than 150 parts by mass tends to lower the dispersibility of filler.

In the present invention, a silane coupling agent may be used in combination with silica. Examples of the silane coupling agent include bis(3-triethoxysilylpropyl)tetrasulfide, bis(3-triethoxysilylpropyl)trisulfide, and bis(3-triethoxysilylpropyl)disulfide. In particular, bis(3-triethoxysilylpropyl)tetrasulfide is preferred because the reinforcing effect is more enhanced.

The silane coupling agent content is preferably not less than 1 part by mass, and more preferably not less than 2 parts by mass, for each 100 parts by mass of silica. The content less than 1 part by mass tends to increase the viscosity of the unvulcanized rubber composition to lower the processability. The silane coupling agent content is preferably not more than 20 parts by mass, and more preferably not more than 15 parts by mass, for each 100 parts by mass of silica. The content more than 20 parts by mass tends not to provide an effect consistent with the cost increase.

The rubber composition of the present invention preferably contains a specific aromatic vinyl polymer, namely, a resin obtained by polymerizing at least one of α-methylstyrene and styrene. This improves the grip performance while maintaining performance in terms of rolling resistance and abrasion resistance, so that the balance among the performance properties is further improved. It should be noted that, in the present invention, the aromatic vinyl polymer is not included in the rubber component.

To produce the aromatic vinyl polymer, at least one of styrene and α-methylstyrene is used as an aromatic vinyl monomer (unit). The polymer may be either a homopolymer of each monomer or a copolymer of both monomers. In particular, having better cost efficiency and higher processability, and being excellent in the balance among the performance properties, a homopolymer of α-methylstyrene or a copolymer of α-methylstyrene and styrene is preferred, and a copolymer of α-methylstyrene and styrene is particularly preferred.

The softening point of the aromatic vinyl polymer is preferably not higher than 100° C., more preferably not higher than 92° C., and still more preferably not higher than 88° C. The softening point higher than 100° C. tends to deteriorate the abrasion resistance and grip performance. The softening point is preferably not lower than 30° C., more preferably not lower than 60° C., and still more preferably not lower than 75° C. The softening point lower than 30° C. tends to deteriorate the grip performance. Here, the softening point herein is measured as set forth in JIS K6220 by using a ring and ball softening point measuring apparatus, and refers to the temperature at which the ball falls.

The weight average molecular weight (Mw) of the aromatic vinyl polymer is preferably not less than 500, and more preferably not less than 800. The Mw less than 500 is less likely to achieve sufficient improvement in terms of rolling resistance and grip performance. The Mw of the aromatic vinyl polymer is preferably not more than 3,000, and more preferably not more than 2,000. The Mw more than 3,000 tends to deteriorate the performance in terms of rolling resistance.

The aromatic vinyl polymer content is preferably not less than 1 part by mass, and more preferably not less than 2 parts by mass, for each 100 parts by mass of the rubber component. The content less than 1 part by mass may fail to achieve improvement in grip performance. The aromatic vinyl polymer content is preferably not more than 100 parts by mass, and more preferably not more than 20 parts by mass, for each 100 parts by mass of the rubber component. The content more than 100 parts by mass tends to deteriorate performance in terms of rolling resistance and abrasion resistance.

The rubber composition of the present invention may appropriately contain additives according to need, such as oils, antioxidants, vulcanizing agents, vulcanization accelerators, and vulcanization accelerator aids, in addition to the above ingredients.

In another aspect, the present invention may provide a tire rubber composition containing a mixture prepared by reacting an active conjugated diene polymer having an alkali metal end with two or more modifying agents. Here, the active conjugated diene polymer having an alkali metal end is obtained by polymerizing a conjugated diene monomer alone or together with an aromatic vinyl monomer, in the presence of an alkali metal catalyst in a hydrocarbon solvent.

That is, though the earlier description illustrates a mixture prepared by reacting the active conjugated diene polymer with specific modifying agents, the present invention is not limited to such an embodiment and includes a mixture prepared by a reaction with any two or more modifying agents. The mixture may, for example, be prepared by a single-batch reaction of an active conjugated diene polymer having an alkali metal end, which is produced in the same manner as mentioned above, with two or more conventionally known terminal modifying agents. The use of such a mixture prepared in a single batch achieves improvement in the balance among the performance properties.

The rubber composition of the present invention can be produced by a usual method. Specifically, for example, the above components are kneaded using a kneading apparatus such as a Banbury mixer, a kneader, and an open roll mill, and the kneaded mixture is then vulcanized, whereby the rubber composition can be produced. The rubber composition is suitably used for tire treads, and tires produced using the rubber composition are suitably used for automobiles, commercial vehicles, two-wheel vehicles, and the like.

The pneumatic tire of the present invention can be produced by a usual method with use of the rubber composition. Specifically, before vulcanization, the rubber composition containing the above components is extruded and processed into the shape of a tread or the like, and then assembled with other tire components in a usual manner in a tire building machine to form an unvulcanized tire. Then, the unvulcanized tire is heated and pressed in a vulcanizer, whereby the pneumatic tire of the present invention can be produced.

EXAMPLES

The present invention will be more specifically described based on examples, but the present invention is not limited to these examples.

In the following, the chemical agents used in examples and comparative examples are listed.

Modified diene rubbers A and B: see the following Preparation Examples 1 to 10 (oil content of each rubber: 15% by mass)
SBR: SBR 1502 produced by JSR Corporation (styrene content: 23.5% by mass)
BR: BR 150B produced by UBE INDUSTRIES, LTD.
Silica: Ultrasil VN3 produced by Degussa ($N_2SA$: 175 $m^2/g$)
Carbon black: SHOBLACK N220 produced by Cabot Japan K.K. ($N_2SA$: 111 $m^2/g$, DBP oil absorption: 115 ml/100 g)
Silane coupling agent: Si69 produced by Degussa (bis(3-triethoxysilylpropyl)tetrasulfide)
Aromatic vinyl polymer: SYLVARES SA85 produced by Arizona Chemical (copolymer of α-methylstyrene and styrene, softening point: 85° C., Mw: 1,000)
Oil: JOMO Process X140 produced by Japan Energy Corporation
Wax: SUNNOC N produced by OUCHI SHINKO CHEMICAL INDUSTRIAL CO., LTD.
Antioxidant: NOCRAC 6C produced by OUCHI SHINKO CHEMICAL INDUSTRIAL CO., LTD. (N-(1,3-dimethylbutyl)-N'-phenyl-p-phenylenediamine)
Stearic acid: Tsubaki produced by NOF Corporation
Zinc oxide: Zinc oxide #1 produced by Mitsui Mining & Smelting Co., Ltd.
Sulfur: Sulfur powder produced by Tsurumi Chemical Industry CO., Ltd.
Vulcanization accelerator: Nocceler NS produced by OUCHI SHINKO CHEMICAL INDUSTRIAL CO., LTD. (N-tert-butyl-2-benzothiazolylsulfenamide)

Preparation Example 1

A 20-L stainless steel polymerization reactor was cleaned and dried, and the air therein was replaced with dry nitrogen. To the reactor were then added 1,3-butadiene (548 g), styrene (235 g), tetrahydrofuran (8.89 g), hexane (10.2 kg), and n-butyllithium (5.22 mmol, n-hexane solution). The mixture was subjected to polymerization with stirring at 65° C. for three hours. After completion of the polymerization, N,N-dimethylaminopropylacrylamide (1.57 mmol, 0.245 g) and 1,3,5-tris (3-trimethoxysilylpropyl)isocyanurate (3.66 mmol, 2.251 g) were added thereto. After the reaction was allowed to proceed with stirring for 30 minutes, methanol (10 ml) was added thereto and the mixture was further stirred for five minutes. Then, the contents were taken out from the polymerization reactor, and 2,6-di-t-butyl-p-cresol (10 g, SUMILIZER BHT produced by Sumitomo Chemical CO., Ltd., the same shall apply hereinafter) and oil (141 g) were added thereto. Most of hexane was distilled out and the resulting mixture was dried under reduced pressure at 55° C. for 12 hours to give a rubber mixture 1.

Preparation Example 2

A rubber mixture 2 was prepared in the same manner as in Preparation Example 1, except that the amount of N,N-dimethylaminopropylacrylamide was changed to 0.52 mmol (0.082 g) and the amount of 1,3,5-tris(3-trimethoxysilylpropyl)isocyanurate was changed to 4.70 mmol (2.894 g).

Preparation Example 3

A rubber mixture 3 was prepared in the same manner as in Preparation Example 1, except that the amount of N,N-dimethylaminopropylacrylamide was changed to 4.70 mmol (0.734 g) and the amount of 1,3,5-tris(3-trimethoxysilylpropyl)isocyanurate was changed to 0.52 mmol (0.322 g).

Preparation Example 4

A rubber mixture 4 was prepared in the same manner as in Preparation Example 1, except that the amount of tetrahydrofuran was changed to 31.12 g; the amount of n-butyllithium (n-hexane solution) was changed to 18.28 mmol; the amount of N,N-dimethylaminopropylacrylamide was changed to 1.83 mmol (0.286 g); and the amount of 1,3,5-tris(3-trimethoxysilylpropyl)isocyanurate was changed to 16.45 mmol (10.131 g).

Preparation Example 5

A rubber mixture 5 was prepared in the same manner as in Preparation Example 1, except that the amount of tetrahydrofuran was changed to 31.12 g; the amount of n-butyllithium (n-hexane solution) was changed to 18.28 mmol; the amount of N,N-dimethylaminopropylacrylamide was changed to 16.45 mmol (2.57 g); and the amount of 1,3,5-tris(3-trimethoxysilylpropyl)isocyanurate was changed to 1.83 mmol (1.126 g).

Preparation Example 6

A rubber mixture 6 was prepared in the same manner as in Preparation Example 1, except that the amount of tetrahydrofuran was changed to 4.15 g; the amount of n-butyllithium (n-hexane solution) was changed to 2.44 mmol; the amount of N,N-dimethylaminopropylacrylamide was changed to 0.24 mmol (0.038 g); and the amount of 1,3,5-tris(3-trimethoxysilylpropyl)isocyanurate was changed to 2.19 mmol (1.351 g).

Preparation Example 7

A rubber mixture 7 was prepared in the same manner as in Preparation Example 1, except that the amount of tetrahydrofuran was changed to 4.15 g; the amount of n-butyllithium (n-hexane solution) was changed to 2.44 mmol, the amount of N,N-dimethylaminopropylacrylamide was changed to 2.19 mmol (0.343 g); and the amount of 1,3,5-tris(3-trimethoxysilylpropyl)isocyanurate was changed to 0.24 mmol (0.15 g).

Preparation Example 8

A rubber mixture 8 was prepared in the same manner as in Preparation Example 1, except that the amount of N,N-dimethylaminopropylacrylamide was changed to 0 mmol (0 g), and the amount of 1,3,5-tris(3-trimethoxysilylpropyl)isocyanurate was changed to 2.44 mmol (1.501 g).

Preparation Example 9

A rubber mixture 9 was prepared in the same manner as in Preparation Example 1, except that the amount of N,N-dimethylaminopropylacrylamide was changed to 2.44 mmol (0.381 g), and the amount of 1,3,5-tris(3-trimethoxysilylpropyl)isocyanurate was changed to 0 mmol (0 g).

Preparation Example 10

A 20-L stainless steel polymerization reactor was cleaned and dried, and the air therein was replaced with dry nitrogen. To the reactor were then added 1,3-butadiene (548.3 g), styrene (235 g), tetrahydrofuran (8.89 g), hexane (10.2 kg), and n-butyllithium (5.22 mmol, n-hexane solution). The mixture was subjected to polymerization with stirring at 65° C. for three hours. After completion of the polymerization, N,N-dimethylaminopropylacrylamide (5.22 mmol, 0.816 g) was added thereto. After the reaction was allowed to proceed with stirring for 30 minutes, methanol (10 ml) was added thereto and the mixture was further stirred for five minutes (modified diene rubber A).

Separately, a 20-L stainless steel polymerization reactor was cleaned and dried, and the air therein was replaced with dry nitrogen. To the reactor were then added 1,3-butadiene (548.3 g), styrene (235 g), tetrahydrofuran (8.89 g), hexane (10.2 kg), and n-butyllithium (5.22 mmol, n-hexane solution). The mixture was subjected to polymerization with stirring at 65° C. for three hours. After completion of the polymerization, 1,3,5-tris(3-trimethoxysilylpropyl)isocyanurate (5.22 mmol, 3.216 g) was added thereto. After the reaction was allowed to proceed with stirring for 30 minutes, methanol (10 ml) was added thereto and the mixture was further stirred for five minutes (modified diene rubber B).

Then, the contents were taken out from each polymerization reactor and these two mixtures were mixed together so that the compounding ratio of the modified diene rubbers A and B (weight ratio of A/B) was 30/70. Thereto were added 2,6-di-t-butyl-p-cresol (10 g) and oil (141 g). Most of hexane was distilled out and the resulting mixture was dried under reduced pressure at 55° C. for 12 hours to give a rubber mixture 10.

Examples and Comparative Examples

The chemical agents in formulation amounts shown in Table 1 or 2, except the sulfur and vulcanization accelerator, were kneaded with a Banbury mixer at 150° C. for five minutes to give a kneaded mixture. To the kneaded mixture were then added the sulfur and vulcanization accelerator and the resulting mixture was kneaded with an open two roll mill at 50° C. for five minutes to provide an unvulcanized rubber composition. A portion of the obtained unvulcanized rubber composition was press-vulcanized at 170° C. for 15 minutes to provide a vulcanized rubber composition.

Another portion of the unvulcanized rubber composition was processed into a tread shape, assembled with other tire components, and vulcanized at 170° C. for 15 minutes to provide a test tire (tire size: 195/65R15).

The obtained vulcanized rubber compositions and test tires were evaluated as follows. The results are shown in Tables 1 and 2.

(Grip Index)

The test tire was mounted on each wheel of a vehicle (FF, 2000 cc, made in Japan), and the vehicle was driven on an asphalt test course (dry road surface). A test driver evaluated the stability of steering control during the driving. The result of each tire was expressed as an index value relative to a value of 100 representing the stability of Comparative Example 1. A larger index value corresponds to a higher level of grip performance (handling stability) on a dry road surface.

(Abrasion Index)

The Lambourn abrasion loss of each vulcanized rubber composition was measured with a Lambourn abrasion tester under the conditions of room temperature, an applied load of 1.0 kgf, and a slip ratio of 30%. Then, a volume loss was calculated from the measured Lambourn abrasion loss. The volume loss of each formulation was expressed as an index value relative to a value of 100 representing the volume loss of Comparative Example 1 by the following equation. A larger index value means better abrasion resistance.

(Abrasion index)=(Volume loss of Comparative Example 1)/(Volume loss of each formulation)×100

(Rolling Resistance Index)

Using a viscoelastic spectrometer VES (produced by Iwamoto Seisakusho), the tan δ of each vulcanized rubber composition was measured under the conditions of a temperature at 70° C., an initial strain of 10%, and a dynamic strain of 2%. The measured value was expressed as an index value relative to a value of 100 representing the tan δ of Comparative Example 1 by the following equation. A larger index value corresponds to a higher level of performance in terms of rolling resistance (lower rolling resistance).

(Rolling resistance index)=(tan δ of Comparative Example 1)/(tan δ of each formulation)×100

TABLE 1

|  |  | Example 1 | Example 2 | Example 3 | Example 4 | Example 5 | Example 6 |
|---|---|---|---|---|---|---|---|
| Formulation (parts by mass) | Modified diene rubbers A and B | 23.6 | 70.8 | 118 | 23.6 | 23.6 | 70.8 |
|  | SBR | 60 | 20 | — | 60 | 60 | 20 |
|  | BR | 20 | 20 | — | 20 | 20 | 20 |
|  | Silica | 50 | 50 | 50 | 50 | 50 | 50 |
|  | Carbon black | 40 | 40 | 40 | 40 | 40 | 40 |
|  | Silane coupling agent | 2.4 | 2.4 | 2.4 | 2.4 | 2.4 | 2.4 |
|  | Aromatic vinyl polymer | — | — | — | — | — | 5 |
|  | Oil | 26.4 | 19.2 | 12 | 26.4 | 26.4 | 19.2 |
|  | Wax | 2 | 2 | 2 | 2 | 2 | 2 |
|  | Antioxidant | 2 | 2 | 2 | 2 | 2 | 2 |
|  | Stearic acid | 2 | 2 | 2 | 2 | 2 | 2 |
|  | Zinc oxide | 3 | 3 | 3 | 3 | 3 | 3 |
|  | Sulfur | 2 | 2 | 2 | 2 | 2 | 2 |
|  | Vulcanization accelerator | 2 | 2 | 2 | 2 | 2 | 2 |
| Contents of modified diene rubbers A and B | Rubber mixture | Preparation Example 1 | Preparation Example 1 | Preparation Example 1 | Preparation Example 2 | Preparation Example 3 | Preparation Example 1 |
|  | Styrene content (% by mass) | 30 | 30 | 30 | 30 | 30 | 30 |
|  | Vinyl bond content (% by mass) | 35 | 35 | 35 | 35 | 35 | 35 |
|  | Ratio of modified diene rubber A | 30 | 30 | 30 | 10 | 90 | 30 |
|  | Ratio of modified diene rubber B | 70 | 70 | 70 | 90 | 10 | 70 |
|  | Weight average molecular weight (million) | 0.7 | 0.7 | 0.7 | 0.7 | 0.7 | 0.7 |
| Evaluation | Grip index | 110 | 120 | 130 | 105 | 110 | 131 |
|  | Abrasion index | 108 | 115 | 110 | 110 | 105 | 115 |
|  | Rolling resistance index | 108 | 110 | 105 | 105 | 110 | 110 |

|  |  |  | Example 7 | Example 8 | Example 9 | Example 10 | Example 11 |
|---|---|---|---|---|---|---|---|
| Formulation (parts by mass) | Modified diene rubbers A and B |  | 70.8 | 70.8 | 23.6 | 118 | 70.8 |
|  | SBR |  | 20 | 20 | 60 | — | 20 |
|  | BR |  | 20 | 20 | 20 | — | 20 |
|  | Silica |  | 50 | 50 | 50 | 50 | 50 |
|  | Carbon black |  | 40 | 40 | 40 | 40 | 40 |
|  | Silane coupling agent |  | 2.4 | 2.4 | 2.4 | 2.4 | 2.4 |
|  | Aromatic vinyl polymer |  | 40 | 90 | 40 | 40 | — |
|  | Oil |  | 19.2 | 19.2 | 26.4 | 12 | 19.2 |
|  | Wax |  | 2 | 2 | 2 | 2 | 2 |
|  | Antioxidant |  | 2 | 2 | 2 | 2 | 2 |
|  | Stearic acid |  | 2 | 2 | 2 | 2 | 2 |
|  | Zinc oxide |  | 3 | 3 | 3 | 3 | 3 |
|  | Sulfur |  | 2 | 2 | 2 | 2 | 2 |
|  | Vulcanization accelerator |  | 2 | 2 | 2 | 2 | 2 |
| Contents of modified diene rubbers A and B | Rubber mixture |  | Preparation Example 1 | Preparation Example 1 | Preparation Example 1 | Preparation Example 1 | Preparation Example 10 |
|  | Styrene content (% by mass) |  | 30 | 30 | 30 | 30 | 30 |
|  | Vinyl bond content (% by mass) |  | 35 | 35 | 35 | 35 | 35 |
|  | Ratio of modified diene rubber A |  | 30 | 30 | 30 | 30 | 30 |
|  | Ratio of modified diene rubber B |  | 70 | 70 | 70 | 70 | 70 |
|  | Weight average molecular weight (million) |  | 0.7 | 0.7 | 0.7 | 0.7 | 0.7 |
| Evaluation | Grip index |  | 133 | 138 | 132 | 140 | 120 |
|  | Abrasion index |  | 113 | 110 | 108 | 110 | 115 |
|  | Rolling resistance index |  | 110 | 110 | 108 | 105 | 110 |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Formulation (parts by mass) | Modified diene rubbers A and B | — | 23.6 | 23.6 | 23.6 | 23.6 | 23.6 | 23.6 |
|  | SBR | 80 | 60 | 60 | 60 | 60 | 60 | 60 |
|  | BR | 20 | 20 | 20 | 20 | 20 | 20 | 20 |
|  | Silica | 50 | 50 | 50 | 50 | 50 | 50 | 50 |
|  | Carbon black | 40 | 40 | 40 | 40 | 40 | 40 | 40 |
|  | Silane coupling agent | 2.4 | 2.4 | 2.4 | 2.4 | 2.4 | 2.4 | 2.4 |
|  | Aromatic vinyl polymer | — | — | — | — | — | — | — |
|  | Oil | 30 | 26.4 | 26.4 | 26.4 | 26.4 | 26.4 | 26.4 |
|  | Wax | 2 | 2 | 2 | 2 | 2 | 2 | 2 |

TABLE 2-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
|  | Antioxidant | 2 | 2 | 2 | 2 | 2 | 2 | 2 |
|  | Stearic acid | 2 | 2 | 2 | 2 | 2 | 2 | 2 |
|  | Zinc oxide | 3 | 3 | 3 | 3 | 3 | 3 | 3 |
|  | Sulfur | 2 | 2 | 2 | 2 | 2 | 2 | 2 |
|  | Vulcanization accelerator | 2 | 2 | 2 | 2 | 2 | 2 | 2 |
| Contents of modified diene rubbers A and B | Rubber mixture | — | Preparation Example 4 | Preparation Example 5 | Preparation Example 6 | Preparation Example 7 | Preparation Example 8 | Preparation Example 9 |
|  | Styrene content (% by mass) | — | 30 | 30 | 30 | 30 | 30 | 30 |
|  | Vinyl bond content (% by mass) | — | 35 | 35 | 35 | 35 | 35 | 35 |
|  | Ratio of modified diene rubber A | — | 10 | 90 | 10 | 90 | — | 100 |
|  | Ratio of modified diene rubber B | — | 90 | 10 | 90 | 10 | 100 | — |
|  | Weight average molecular weight (million) | — | 0.2 | 0.2 | 1.5 | 1.5 | 0.7 | 0.7 |
| Evaluation | Grip index | 100 | 105 | 110 | 105 | 110 | 110 | 110 |
|  | Abrasion index | 100 | 98 | 95 | 99 | 99 | 110 | 98 |
|  | Rolling resistance index | 100 | 108 | 113 | 108 | 113 | 99 | 110 |

Tables 1 and 2 show that the grip performance, the abrasion resistance, and the performance in terms of rolling resistance were improved in a balanced manner in the Examples, while these performance properties were not achieved in a balanced manner in the Comparative Examples. From the results of Comparative Example 1 where neither of the rubbers A and B was used, Comparative Example 6 where only the rubber B was used, Comparative Example 7 where only the rubber A was used, and Example 1 where both of the rubbers A and B were used, it was demonstrated that the use of both rubbers synergistically improves the balance among the performance properties, especially in terms of abrasion resistance and rolling resistance.

From the results of comparing Examples 4 and 9 or Examples 3 and 10, it was also demonstrated that the addition of an aromatic vinyl polymer improves the grip performance while maintaining performance in terms of abrasion resistance and rolling resistance, thereby improving the trade-off between these properties.

The invention claimed is:

1. A tire rubber composition comprising:
a modified diene rubber A which is modified with an acrylamide compound represented by the following formula (I); and
a modified diene rubber B which is modified with a modifying compound represented by the following formula (III) alone or together with a silicon or tin compound represented by the following formula (II),
a weight average molecular weight of a total of the modified diene rubbers A and B being 300,000 to 1,400,000, the formula (I) being as follows:

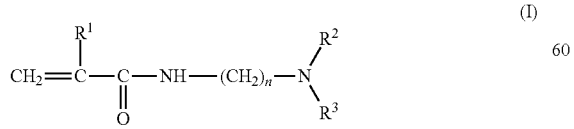

wherein $R^1$ represents hydrogen or a methyl group, $R^2$ and $R^3$ each represent an alkyl group, and n represents an integer;

the formula (II) being as follows:

wherein R represents an alkyl, alkenyl, cycloalkenyl, or aromatic hydrocarbon group, M represents silicon or tin, X represents halogen, a represents an integer of 0 to 2, and b represents an integer of 2 to 4; and the formula (III) being as follows:

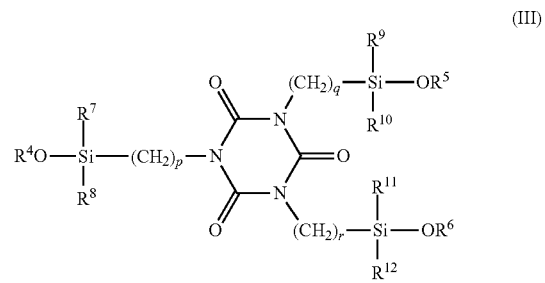

wherein $R^4$ to $R^6$ are the same as or different from each other and each represent a $C_{1-8}$ alkyl group, $R^7$ to $R^{12}$ are the same as or different from each other and each represent a $C_{1-8}$ alkoxy or alkyl group, and p to r are the same as or different from each other and each represent an integer of 1 to 8.

2. The tire rubber composition according to claim 1, wherein the modified diene rubbers A and B are a mixture which is prepared by reacting an active conjugated diene polymer having an alkali metal end with the acrylamide compound and with the modifying compound alone or together with the silicon or tin compound, the active conjugated diene polymer being obtained by polymerizing a conjugated diene monomer alone or together with an aromatic vinyl monomer, in the presence of an alkali metal catalyst in a hydrocarbon solvent.

3. The tire rubber composition according to claim 1, wherein, in the modifying compound, $R^4$ to $R^6$ each are a methyl, ethyl, propyl or butyl group, $R^7$ to $R^{12}$ each are a methoxy, ethoxy, propoxy or butoxy group, and p to r each are an integer of 2 to 5.

4. The tire rubber composition according to claim 1, further comprising an aromatic vinyl polymer obtained by polymerizing at least one of α-methylstyrene and styrene.

5. A pneumatic tire comprising a tread produced using the tire rubber composition according to claim 1.

6. The tire rubber composition according to claim 1,
wherein the modified diene rubbers A and B are modified styrene butadiene rubbers,
the vinyl bond content of the butadiene units of a total of the rubbers A and B being 20 to 60% by mass,
the styrene content of a total of the rubbers A and B being 15 to 50% by mass.

7. The tire rubber composition according to claim 1,
wherein a weight ratio of A/B of the modified diene rubbers A and B is 5/95 to 95/5, and
the total amount of the modified diene rubbers A and B in 100% by mass of the rubber component is not less than 2% by mass.

8. The tire rubber composition according to claim 1, further comprising styrene butadiene rubber and/or butadiene rubber.

9. The tire rubber composition according to claim 1, further comprising carbon black and/or silica.

\* \* \* \* \*